United States Patent
Miles

(10) Patent No.: US 9,816,729 B2
(45) Date of Patent: *Nov. 14, 2017

(54) SOLAR FLUX CONVERSION MODULE WITH SUPPORTED FLUID TRANSPORT

(71) Applicant: Mark W Miles, Atlanta, GA (US)

(72) Inventor: Mark W Miles, Atlanta, GA (US)

(*) Notice: Subject to any disclaimer, the term of this patent is extended or adjusted under 35 U.S.C. 154(b) by 385 days.

This patent is subject to a terminal disclaimer.

(21) Appl. No.: 14/691,559

(22) Filed: Apr. 20, 2015

(65) Prior Publication Data

US 2015/0226456 A1    Aug. 13, 2015

Related U.S. Application Data

(63) Continuation-in-part of application No. 12/623,337, filed on Nov. 20, 2009, now Pat. No. 9,057,538.

(51) Int. Cl.
| | |
|---|---|
| F24J 2/10 | (2006.01) |
| F24J 2/28 | (2006.01) |
| F24J 2/50 | (2006.01) |
| F24J 2/46 | (2006.01) |
| F24J 2/52 | (2006.01) |

(52) U.S. Cl.
CPC ............... *F24J 2/28* (2013.01); *F24J 2/1047* (2013.01); *F24J 2/505* (2013.01); *F24J 2002/4656* (2013.01); *F24J 2002/5275* (2013.01); *Y02E 10/44* (2013.01); *Y10T 29/49355* (2015.01)

(58) Field of Classification Search
CPC ...................... F24J 2/28; F24J 2/10; F24J 2/05
USPC ........... 126/694, 270, 291, 259, 444; 136/89
See application file for complete search history.

(56) References Cited

U.S. PATENT DOCUMENTS

| | | | | |
|---|---|---|---|---|
| 3,985,116 A * | 10/1976 | Kapany | ........... | F24J 2/04 126/643 |
| 4,119,083 A * | 10/1978 | Heyen | ........... | F24J 2/28 126/674 |
| 4,252,108 A * | 2/1981 | Drow | ........... | F24J 2/0494 126/648 |
| 8,985,097 B2 * | 3/2015 | Swift | ........... | F24J 2/0444 126/635 |
| 9,347,687 B2 * | 5/2016 | Heaton | ........... | F24J 2/28 |
| 9,541,306 B2 * | 1/2017 | Miles | ........... | F24J 2/1047 |
| 9,557,077 B2 * | 1/2017 | Miles | ........... | F24J 2/1047 |
| 2010/0218496 A1 * | 9/2010 | Miles | ........... | F02G 1/055 60/517 |
| 2011/0120451 A1 * | 5/2011 | Miles | ........... | F24J 2/28 126/635 |
| 2011/0232723 A1 * | 9/2011 | Ostermann | ........... | C25B 1/003 136/248 |
| 2012/0000530 A1 * | 1/2012 | Miles | ........... | F24J 2/055 136/259 |

* cited by examiner

*Primary Examiner* — Gregory Huson
*Assistant Examiner* — Nikhil Mashruwala
(74) *Attorney, Agent, or Firm* — HM Law Group LLP; Vani Moodley, Esq.

(57) ABSTRACT

In one embodiment a solar collector is provided. The collector has a modular heat transfer component, which includes a heat transfer core to heat up a heat transfer fluid in the form of an aerogel. The heat transfer core positioned comprises a light absorption element, and a fluid transfer element in the form of an aerogel. The aero gel comprises voids shaped and dimensioned to support passive pumping of the heat transfer fluid therethrough.

26 Claims, 9 Drawing Sheets

Prior Art

Prior Art

400

402

SOLAR FLUX CONVERSION MODULE WITH SUPPORTED FLUID TRANSPORT

This application is a continuation-in-part of U.S. patent application Ser. No. 12/623,337, titled "SOLAR FLUX CONVERSION MODULE" filed on Nov. 20, 2009, the specification of which is hereby incorporated herein by reference.

FIELD

Embodiments of the invention relate to devices and methods to harness solar radiation as an energy source.

BACKGROUND

Solar collectors are devices designed to convert solar radiation into heat that can be used to perform work.

One design of one type of solar collector known as the flat plate solar collector is illustrated schematically in FIG. 1 of the drawings. Referring to FIG. 1, the flat plate solar collector includes a housing 100 comprising a transparent cover plate glass 102. In use, solar radiation enters the housing 100 through the cover plate glass 102 and strikes an absorption plate 110 located within the housing 100. The absorption plate 110 may be coated with a material capable of absorbing solar radiation and converting the solar radiation into heat. The flat plate collector includes a pipe array 106, which is bonded to the absorber plate 110 such that a heat transfer fluid entering the array 106 at entry point 104, is subsequently heated, and emerges at exit point 108 at a higher temperature. The space between cover plate glass 102 and the absorber plate 110 is usually filled with air. The space below the absorber plate 110 is usually filled with an insulating material 112.

The performance of the flat plate collector, in terms of maximum achievable output temperature of the heat transfer fluid, is limited to a large extent by thermal losses. These losses can occur via radiation from the pipe array 106 and from the absorber plate 110. The thermal losses can also occur via convection through the air disposed between the absorption plate 110 and the cover plate glass 102. Finally, the thermal losses can occur via conduction through the insulating material 112. The dominant losses are via convection and conduction. Typical maximum operational temperatures reached by the heat transfer fluid after thermal losses are about 120° C.

Another design for a solar collector is known as an evacuated tube array. This design is illustrated schematically in FIG. 2 of the drawings. Referring to FIG. 2, the evacuated tube array comprises a collection of evacuated tubes 202, one of which is shown in cross-section. As will be seen from the cross-section, each tube 202 comprises an outer transparent shell 210, which surrounds an inner absorbing shell 212. In use, solar radiation passes through the outer shell 210 and impinges on an inner absorbing shell 212 where it is absorbed and converted to heat. The inner shell 212 and the outer shell 210 are separated by a vacuum and have no internal supports with the exception of a mechanical support at one end of the tube. Heat is transferred via a heat transfer fluid circulating through an internal pipe 214. Each of the internal pipes of the individual tubes 202 within the evacuated tube array is connected such that heat transfer fluid entering at entry point 204, collects heat from all of the tubes 202 and emerges at a higher temperature at exit point 206.

The performance of evacuated tubes 202 is also limited by thermal losses. In this case, however, the losses are not dominated by convection or conduction because of the presence of a vacuum, and the small number of heat conducting internal supports. Instead, thermal losses in the evacuated tubes 202 evacuated tube array design are dominated by radiation losses from the evacuated tubes 202. These losses increase as the temperature of the evacuated tubes 202 increases according to classical blackbody theory. Typical maximum operational temperatures of the heat transfer fluid for the evacuated tube array design are about 200° C.

SUMMARY

According to one aspect of the invention, there is provided a solar collector, comprising:
  a solar collector body defining a housing with at least one window to permit solar radiation to enter the solar collector body;
  a heat transfer component positioned within the solar collector body and comprising:
    a heat transfer component housing;
    a heat transfer core positioned within the heat transfer component housing and having a light absorption element, and a fluid transfer element comprising an aerogel with voids shaped and dimensioned to support passive pumping of the heat transfer fluid therethrough;
    at least one ingress conduit disposed between the heat transfer core and the heat transfer component housing;
    an inlet to introduce a heat transfer fluid into the at least one ingress conduit;
    at least one egress conduit in flow communication with the heat transfer core; and
    an outlet to allow the heat transfer fluid in the egress conduit to exit the egress conduit; wherein heat transfer fluid is transferred from the at least one ingress conduit into the heat transfer core by the fluid transfer element, undergoes heating in the heat transfer core with heat generated through the absorption of light by the light absorption element, and is released into the egress conduit; and wherein the heat transfer fluid in the at least one ingress conduit, and/or the fluid transfer element, traps thermal radiation from the heat transfer core thereby at least partially preventing thermal radiative losses from the heat transfer core.

Other aspects will be apparent from the description, claims, and drawings.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not others.

Figure 1:
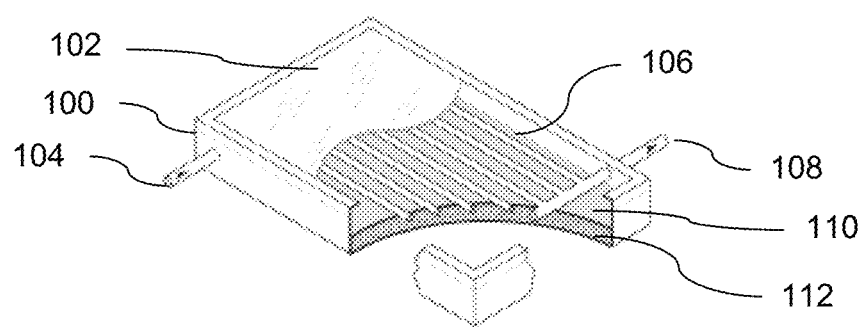
FIG. 1 of the drawings is prior art showing a conventional non-evacuated flat plate solar collector.
Figure 2:
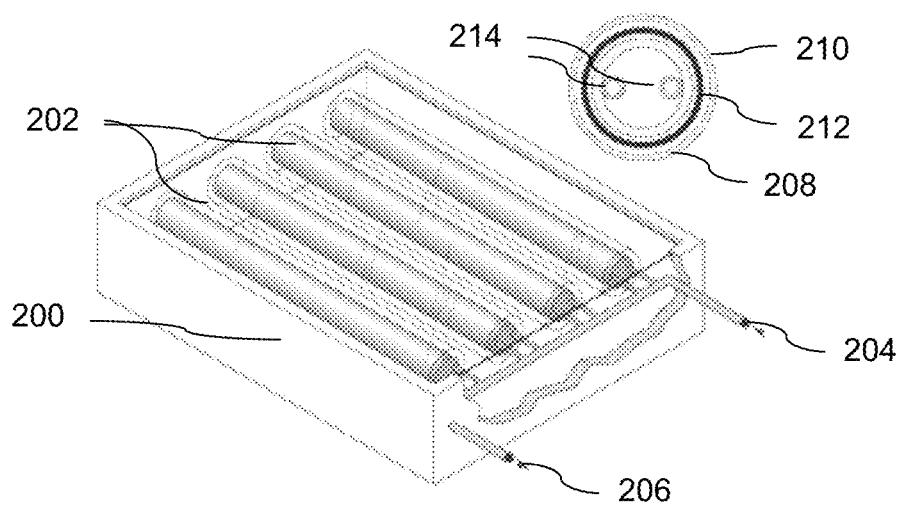
FIG. 2 of the drawings is prior art showing an evacuated tube solar collector.
Figure 3:
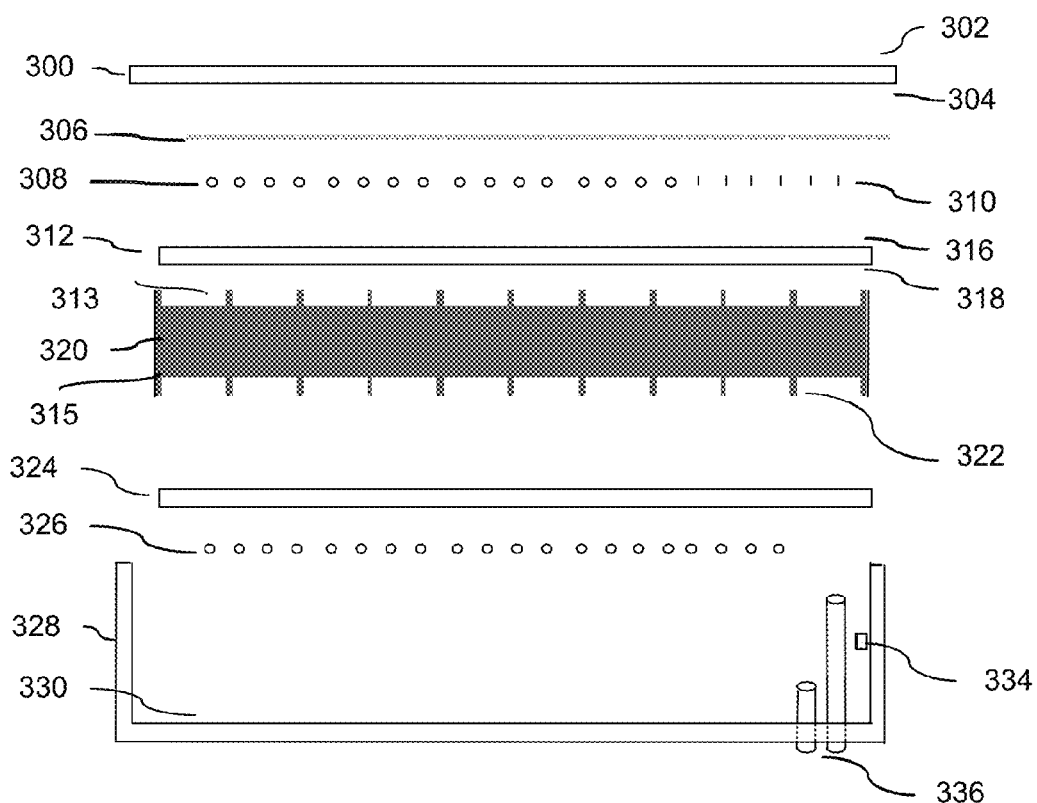
FIG. 3 of the drawings is an exploded and assembled schematic diagram of a monolithic evacuated flat plate solar flux converter, in accordance with one embodiment of the invention.
Figure 3:
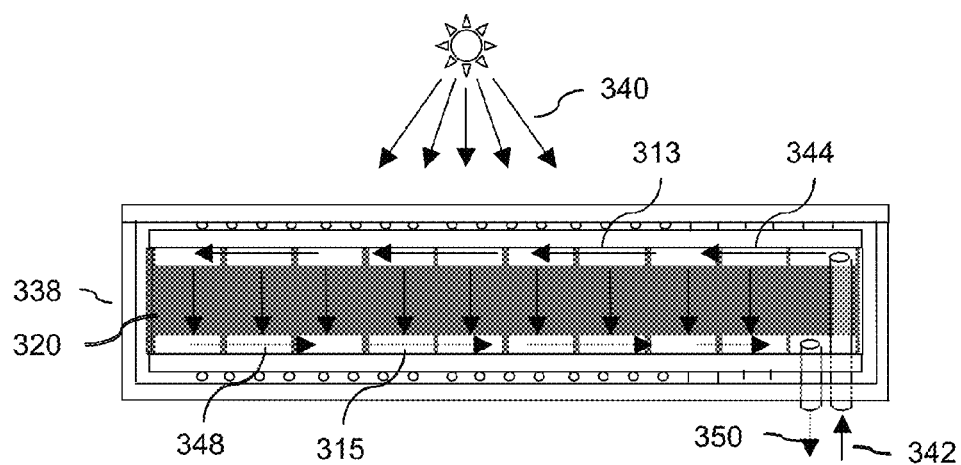

In one embodiment, a solar collector which makes use of a fluid transfer element to support the flow of a heat transfer fluid is disclosed. FIG. 3 shows exploded and assembled views of the solar collector, in accordance with one embodiment. As will be seen, the solar collector includes a face sheet 300 of glass or some other material. In one embodiment, the face sheet 300 is transparent to visible and near infrared light, and is non-permeable. The face sheet 300 may thus be capable of supporting a vacuum. In one embodiment, the face sheet 300 may include anti-reflection coatings 302 and 304 applied to its outer and inner surfaces. These coatings 302 and 304 minimize reflective losses that normally occur when light is transmitted through glass. The solar collector may also include a micro-optic array 306, which serves to concentrate solar radiation from a wide collection angle to impinge on a heat transfer component (to be described).

In one embodiment, the micro-optic array 306 is in the form of a thin replicated light concentrating array. The micro-optic array 306 may comprise multiple elements in the form of compound parabolic concentrating elements though it may comprise one or more other optical structures. The micro-optic array 306 may be molded or formed from a transparent plastic material though glass like materials that can be molded and fired at an elevated temperature may suffice. Advantageously, the material is low out gassing, that is to say it emits little or no volatile compounds when it resides in a vacuum.

A standoff structure array 308 and 310 provides physical standoffs between the micro-optic array 306, and a heat transfer component cover sheet 312. Similar standoffs are described in U.S. patent application Ser. No. 12/396,336, which is hereby incorporated by reference. The function of the standoffs is to provide mechanical support between the micro-optic array 306 and the heat transfer component cover sheet 312, while minimizing thermal losses via conduction. As such the standoffs are designed to have minimal contact area at the point where they touch the surfaces of the micro-optic array 306 and/or the heat transfer component cover sheet 312. The standoffs may be made from a material with low thermal conductivity including but not limited to glass, oxides, and polymeric materials, and is ideally transparent to visible light and near infrared light. In FIG. 3, the standoff structures 308 and 310 are shown to contrast two approaches to their design. However, it is to be appreciated that only one solution would be implemented in a particular solar collector, in some embodiments. The standoffs 308 are in the form of microscopic spheres that can be made from silicon dioxide or other oxides or perhaps polymers. Because of their spherical shape, the size of the surface contact area is minimized and determined by the flatness and rigidity of the two surfaces being separated, viz. the microarray optic 306 and the heat transfer component 312. This reduces thermal losses via conduction. The low thermal conductivity of silicon dioxide reduces these losses even further.

The standoffs 310 are in the form of micro-machined or micro-molded high aspect ratio posts or pillars. High aspect ratio refers to the fact that their height, i.e. the assembled distance between the micro-optical array 306 and the cover sheet 312, is much larger than their lateral dimensions. This minimizes the surface contact area and thus reduces thermal conduction. Material choice for the standoff 310 may be made based on the availability of appropriate machining or molding techniques and the suitability of candidate low thermal conductivity materials. The heat transfer component cover sheet 312 may also include a combination of anti-reflection, low emissivity, or heat mirror coatings 316 and 318, on its opposed surfaces.

The heat transfer component comprises a heat transfer core 320, heat transfer core cover sheet 312, heat transfer core back sheet 324, and support posts 322 on either side of the heat transfer core 320. The support posts may not be required in some embodiments. The support posts 322 physically separate the heat transfer core 320 from the heat transfer core cover sheet 312 thereby to create a fluid flow conduit 313 there between. Likewise, the support posts 322 physically separate the heat transfer core 320 from the heat transfer core back sheet 322 thereby to create a fluid flow conduit 315 there between.

Functionally, the heat transfer core 320 may be regarded as having two functional elements, viz. a fluid transfer element and a light absorption element. A purpose of the fluid transfer element is to transport or convey a heat transfer fluid as will be described. A purpose of the light absorption element is to trap or absorb light thereby to produce heat. In some embodiments, the aforesaid functional elements may be provided by the same physical or structural component or they may be provided by different physical components. In one embodiment, the heat transfer core 320 may be defined by a porous planar element comprising a number of materials including but not limited to metallic or graphite foams, sintered metals or ceramics, or another material medium with high thermal conductivity and whose porosity can be defined during their manufacture, or through micromachining or other micro-fabrication techniques.

Being porous, the fluid transfer element of the heat transfer core 320 may include a myriad of microscopic voids which, are connected so that fluids and/or gasses may pass there through. The voids are shaped, dimensioned, and sized, in certain embodiments, to encourage, facilitate, or otherwise support the passive transport of liquids or gasses through the heat transfer core 320. In one embodiment this passive transport may be accomplished via a wicking phenomenon. Thus, the aforesaid voids serve to perform the fluid transfer function. The porosity of the heat transfer core 320 is designed such that light which, strikes its upper surface cannot pass through the entire body of the heat transfer core 320.

In one embodiment the fluid transfer element of the heat transfer core 320, may comprise aerogel in particulate or granular form, or aerogel in the form of rectangular slabs or other pre-molded monolithic geometric forms which are uniform in structure. The manufacturing process may comprise the creation of a colloidal gel within a mold using processes and precursors which are well known and established in the art of making aerogel. The process may further involve air drying or supercritical drying using an organic solvent or carbon dioxide as one of the final steps of manufacture. The manufacturing process may also include the formation of a rapidly solidifying mixture, by gel formation, which is directly atomized by a gaseous medium via a nozzle in a falling tower, the resulting droplets solidifying during the falling time into aerogel particles, or variations of this process which are known by those skilled in the art of aerogel manufacture. The aerogel may be hydroscopic or hydrophobic. If the final form of the aerogel is particulate then this form may be achieved directly during the manufacturing process, or by making monolithic forms which are subsequently broken and ground into a particulate form.

The aerogel particles may be formed or molded into solid shapes by a process which binds the particles together. Such a process may include the application of heat and pressure in the presence of a gas or gasses, such as air or other organic or inorganic gasses, whose composition is controlled to enhance the binding of the particles together.

The aerogel may comprise organic aerogel, inorganic aerogel (e.g. metal oxides) or a mixture thereof. When the aerogel is of an organic form it is preferably selected from the group based on derived from or consisting of resorcinol-formaldehyde, melamine-formaldehyde, and combinations thereof. When the aerogel is inorganic it is preferably selected from the group based on derived from or consisting of metal oxides such as silica, titania, alumina and combinations thereof with silica being the preferred material.

In some embodiments, the upper surface areas of the heat transfer core 320, which are exposed to incident light, may be coated with one or more light absorbing films. These films are designed to maximize the amount of light absorbed and minimize the amount of heat radiated. Thus, the aforesaid films serve the light absorption function of the core 320. Many such coatings exist including metallic oxynitrides, black chrome, and induced absorber optical stacks. Their design and preparation are well known by those skilled in the art of solar absorption coatings. The upper surface areas may also be machined or molded so that it is non-planar, that is to say said upper surfaces may include features such as depressions, slots, or voids which penetrate partially into the heat transfer core 320. These features may have a variety of different geometries and dimensions. A role of these features is to allow incident light to propagate further into the heat transfer core before being absorbed, thereby providing another means to modify the thermodynamic and thermofluidic performance of the collector. The overall thickness of the heat transfer core may also vary in such a way so that its thickness is greater at the end of the collector opposite the region where heat transfer fluid enters. This may be necessary in order to accommodate a higher heat transfer fluid flow which can occur at the fluid inlet region of the collector and will decrease gradually as more of the fluid is absorbed into the heat transfer core as the fluid propagates from the fluid inlet region to the end of the collector. Support posts 322, are defined on the exterior surfaces of heat transfer core 320, during the process of its fabrication, though it is possible that these structures may be added at a later stage. The support posts 322 serve to provide mechanical coupling between the heat transfer core 320, heat transfer core cover sheet 312, and heat transfer core back sheet 324. Back sheet 324 does not have to transmit light, therefore it may comprise one of a variety of materials including glass, ceramics, metals, metal foils, or special polymeric materials. The primary requirement of the material is that it be capable of supporting a vacuum.

Standoff array 326 performs a similar function to that of standoff array 308/310. As such it may take a similar form and utilize similar materials as already described. In this case the array 326 provides mechanical support between heat transfer core, back sheet 324, and collector housing plate 328, while minimizing thermal losses through conduction.

A collector housing plate 328 serves to protect the internal components from environmental elements, and to maintain a vacuum internally. The collector housing plate 328 does not have to transmit light and thus may be fabricated from a wider variety of materials including but not limited to glass, metals, ceramics, metallic foils, and special polymeric materials. The primary requirement of the material is that it can endure exposure to outside environments, and is non-permeable to gasses thereby to support a vacuum. Coating 330 is a film or stack of thin films whose function is to reflect all infrared radiation emitted by the internal components of the collector. The coating 330 may be comprised of a simple coating of gold, or a more complicated stack of thin films. Getter 334 is a material whose function is to absorb any residual gasses that remain after the manufacturing process or that develop during the course of the operation of the module. It is generally a solid and can be selected from a variety of materials including but not limited to barium, zeolite compounds, or other appropriate material which are well known to those skilled in the art.

Heat transfer fluid inflow/outflow tubes 336 provide an inlet/outlet for heat transfer fluids and gasses between the internal components and external system components to which heat is being transferred.

All of the above described components are aligned, laminated, and/or bonded to produce the assembled solar collector 338. The combination of the cover sheet 312, the heat transfer core 320, and the back sheet 324 forms a hermetically sealed laminate which is referred to herein as the heat transfer component. The combination of the components 300, 328, and 330 forms a body defining a housing for the heat transfer component In one embodiment the heat transfer component resides within a vacuum to be established between the face sheet 300, and the housing plate 328. Lamination and bonding techniques may involve some combination of low out gassing adhesives, low temperature soldering between similar or dissimilar materials, heat driven glass frit sealing processes, and anodic bonding techniques. Other lamination and bonding techniques may be applicable as will be understood by those skilled in the art. The main requirements are that those bonds which reside within the evacuated portion of the solar collector be low or non out gassing, bonds which reside within the heat transfer core be compatible with the heat transfer fluid, and bonds which act as vacuum seals must be able to maintain a vacuum for the lifetime of the collector. All of the bonds and materials comprising the collector must be compatible from a thermal expansion standpoint so that changes in temperature will not compromise the physical and seal integrity, and functioning of the module.

The solar collector 338 receives incident light 340 from the sun. Most of this light is transmitted through the intervening components where it strikes the heat transfer core 320 and is converted into heat. Heat transfer fluid 344 may be water, a synthetic organic, silicone fluids, or any other heat transfer fluid as will be understood by one skilled in the art. Heat transfer fluid 344 may also be in the form of a gas or a combination of gasses including but not limited to air, argon, krypton and xenon. The heat transfer fluid 344 may also be pressurized at a pressure which, is at or slightly above atmospheric pressure or as low as one tenth to one hundredth of normal atmospheric pressure. The fluid is either pumped in via an external pump through inflow pipe 342, or drawn in via a passive process that is supported by or facilitated by the pore geometry of the fluid transfer element. Wicking effects within the heat transfer core 320 may provide this function. From the inflow pipe 342 which, defines an inlet to the collector 338, the heat transfer fluid enters the fluid conduit 313. The fluid conduit 313 thus defines an ingress conduit. From the fluid conduit 313, the heat transfer fluid undergoes heating by absorbing some of the incident light, but primarily through contact with the heat transfer core 320. The temperature of the heat transfer fluid will rise to the point of evaporation as it flows through the heat transfer core 320. At what temperature this occurs depends on the properties of the heat transfer fluid, the internal pressure of the heat transfer core 320, and the physical properties of the heat transfer core 320. A result of the aforementioned heating of the heat transfer fluid is a heat transfer vapor 348 which flows into the fluid flow conduit 315. The heat transfer vapor 348 transports heat from the heat transfer core 320 in the process of evaporating. The resulting thermal energy can thus be extracted via outflow pipe 350 which, defines an outlet for the collector 338. The fluid flow conduit 315 thus defines an egress conduit via which the heat flow vapor 348 is extracted.

Figure 4:
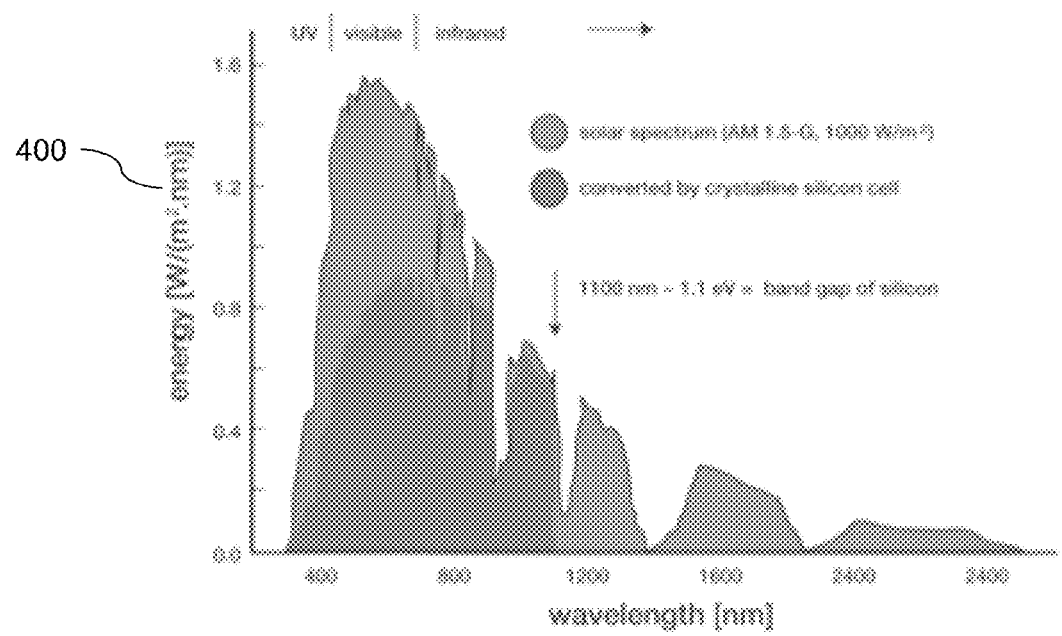
FIG. 4 of the drawings are two diagrams illustrating the solar spectrum, and the light absorption characteristics of water.
Figure 4:
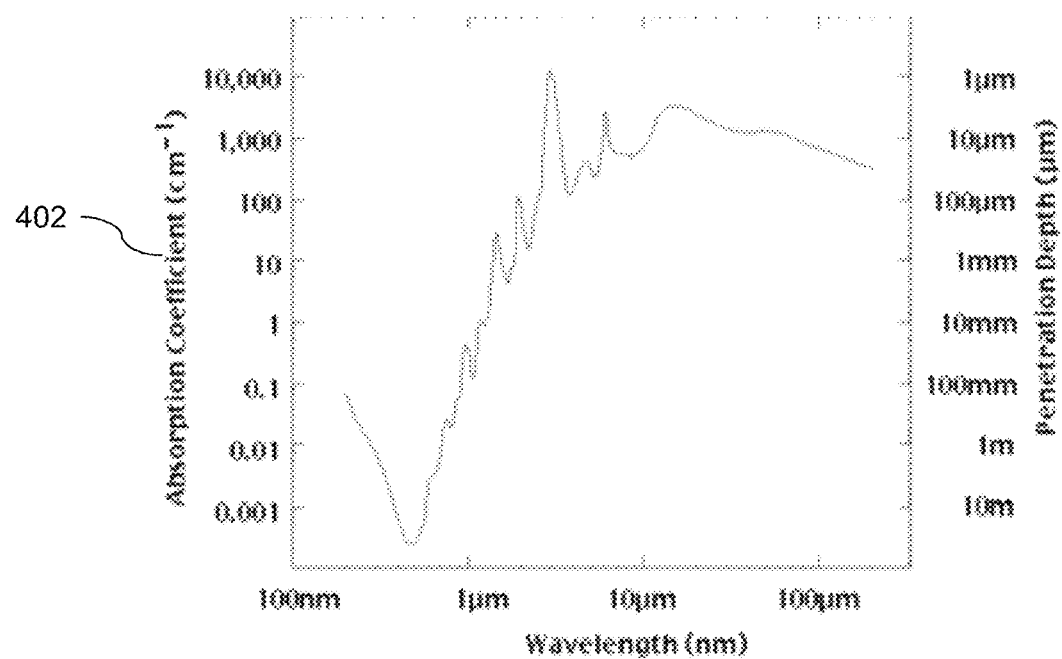

Advantageously, thermal radiative losses from the heat transfer core 346 may be minimized by using the properties of the heat transfer fluid itself. Chart 400 of FIG. 4 shows the spectrum of radiation emitted by the sun that strikes the earth's surface. In general it is useful to absorb and convert as much of this energy as possible. Chart 400 illustrates that the bulk of the received energy from the sun resides between the wavelengths of 200 nm to 2400 nm. Chart 402 illustrates the absorption spectrum of water, which is one candidate heat transfer fluid. As can be seen, water is extremely transparent to light in the wavelengths from 200 nm to 1000 nm. As the wavelength increases, the absorption of incident light increases dramatically. This property may be used to advantage, and there is evidence to suggest that other heat transfer fluids exhibit similar performance.

Figure 5:
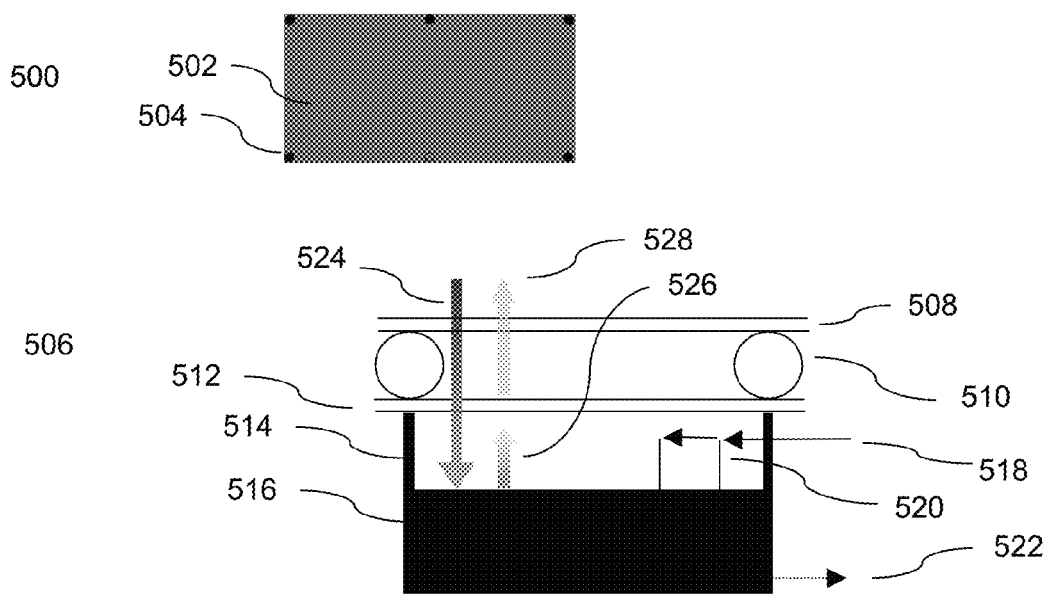
FIG. 5 of the drawings is a diagram showing detailed operation of the solar flux converter, in accordance with one embodiment of the invention.

FIG. 5 illustrates how the absorption characteristics of the heat transfer fluid are exploited by the solar collector of the present invention in order to eliminate or at least reduce radiation losses. Referring to FIG. 5, reference numeral 500 indicates an embodiment of the solar collector of the present invention as seen from the perspective of the solar light source. The embodiment 500 includes a heat transfer core 502 and heat transfer core standoffs 504, as described. The heat transfer core standoffs provide mechanical support between the heat transfer core 502 and the intervening heat transfer core cover sheet. Reference numeral 506 indicates the same embodiment of the solar in cross-sectional view. As will be seen the heat transfer core standoffs 514 provide the aforementioned mechanical support and also create a space for incoming heat transfer fluid 518 to flow in the direction indicated by the arrows. Spacer balls 510 provide mechanical support between heat transfer core cover sheet 512 and face sheet 508. A vacuum resides between sheet 508 and 512. Some portion of the incoming light 524 is absorbed by heat transfer fluid 518 while the bulk is absorbed by the heat transfer core 516. If there were no flow of the heat transfer fluid 518, then over time the heat transfer core 516, the heat transfer fluid 518, and the heat transfer core cover sheet 512, would all rise to the same temperature.

The heat in the heat transfer core 516 would be transmitted via conduction and re-radiated infrared radiation 526 (which is absorbed by the heat transfer fluid 518). The heat in the heat transfer fluid 518 would be transferred to the heat transfer core cover sheet 512 primarily by conduction though there will be some radiative transfer. The net result, and according the theory of blackbody radiation, is that much of this heat will be lost to the environment via re-radiated infrared radiation 528. The amount of heat radiated will increase as the temperature increases.

In the circumstance where heat transfer fluid 518 is flowing, a different dynamic is set up. In this case the temperature of the heat transfer fluid 518 will rise due to the aforementioned processes. However, with sufficient flow rate, the process in which the heat of the fluid 518 is conducted to the cover sheet 512 is defeated. The flow rate has to be higher than the thermal propagation rate of the heat transfer fluid 518. If this constraint is met, then little if any heat can be transferred from the heat transfer core 516 to the heat pipe cover sheet 512 via conduction through heat transfer fluid 518. Radiative losses from the heat transfer core 516 are mitigated or eliminated by absorption within the heat transfer fluid 518. This will occur if the distance between the heat transfer core 516 and the heat pipe cover sheet 512 is sufficient to allow for complete absorption. This distance could range from several hundred microns to millimeters depending on fluid flow requirements, properties of the heat transfer fluid, and thermal optimization of the solar collector. In effect, a thermal gradient is produced within the flow indicated by arrows 520 with lower temperature near the heat transfer core cover sheet 512, and higher temperature near the heat transfer core 516, via a combination of radiative absorption and thermal conduction between the three different elements. Thermal radiation emitted by the hotter portions of the heat transfer fluid 518 in this gradient must propagate through more of the heat transfer fluid 518 and therefore is more completely absorbed, with the resulting heated fluid driven back towards the heat transfer core 516. During nominal operation, the heat transfer fluid 518 is heated to the point of evaporation as it travels through the heat transfer core 516. The resulting vapor is extracted via outflow pipe 522, along with the heat it contains.

In one embodiment the solar collector utilizes what is known as a two phase heat transfer approach. That is to say that the heat transfer fluid 518 flows into the solar collector in the form of a liquid phase, and emerges from the collector in a vapor phase. This has the advantage of minimizing the amount of liquid that must be pumped in order to achieve a certain heat flow rate. It also makes it possible to eliminate external pumping by using the wicking effect to passively pump the fluid. The solar collector may also be operated using single phase heat transfer in the form of a liquid phase only. This requires more power to be utilized on pumping the heat transfer fluid, but may result in a simpler heat transfer network connecting the solar collector to other system components.

Figure 6:
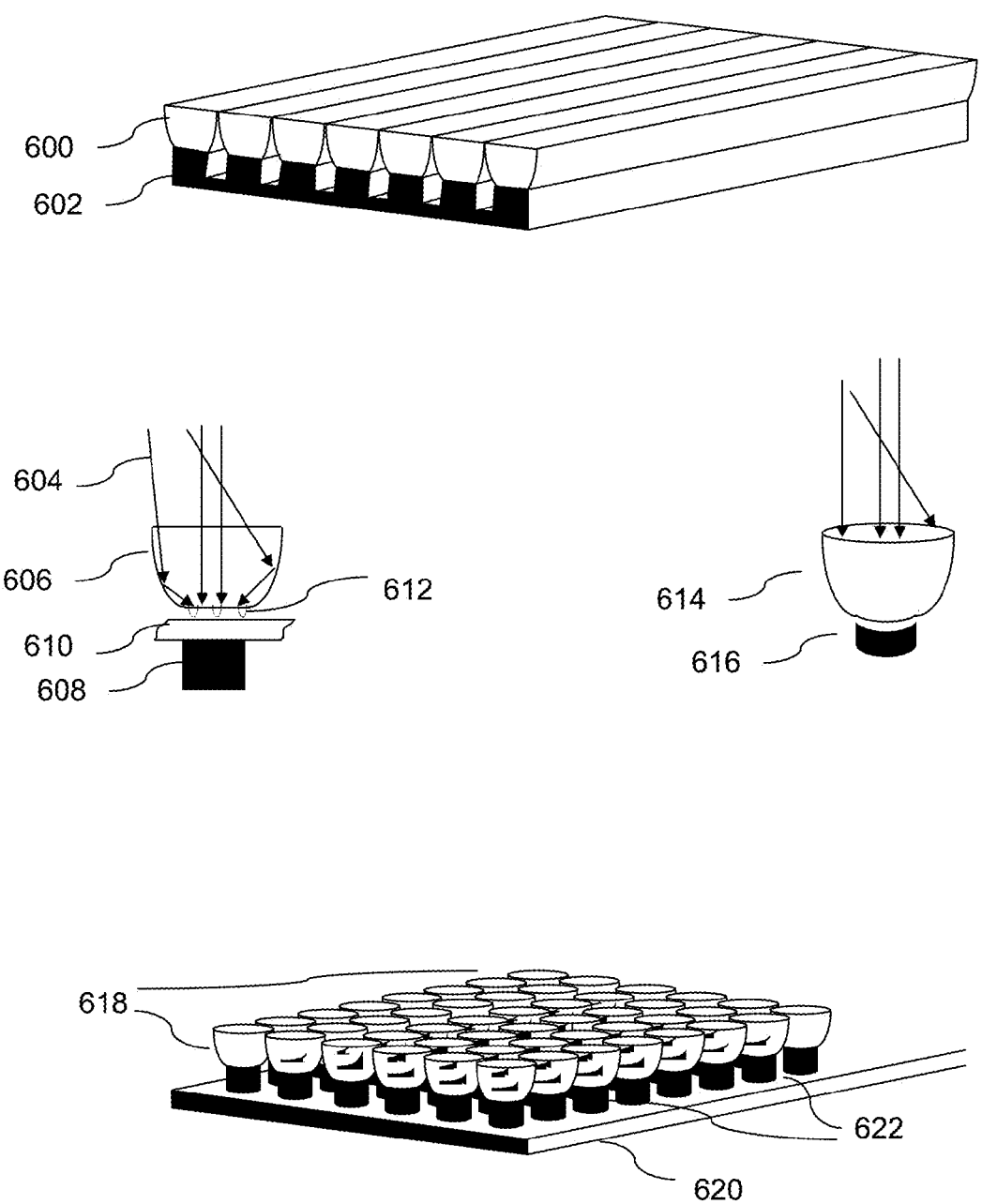
FIG. 6 of the drawings illustrates a micro-optical concentration array coupled to a heat transfer core, and diagrams of a 2D and a 3D compound parabolic concentrating optic, in accordance with one embodiment of the invention.

FIG. 6 shows a micro-optical array 600, which is coupled to a heat transfer core 602. In this case the micro-optical array is a collection of 2D (two dimensional) compound parabolic concentrators (CPCs). CPCs are well understood optical components that fall into the class of non-imaging optics. Their function and design are described in detail in the book entitled "Nonimaging Optics" by Roland Winston et. al. In general CPCs can act as concentrators of incident light where the degree of concentration is inversely proportional to the acceptance angle of the incoming light. CPC 606 is shown concentrating incident light rays 604 for coupling with heat transfer core 608. In one embodiment, the CPCs are made from a transparent material, whose index of refraction is higher than that of the environment, thus rays 604 are internally reflected via total internal reflection. The role of concentration is to increase the intensity of the incident flux at a given location in order to achieve greater temperatures. In order to accomplish this, the exposed surface area of the absorber or heat transfer core 608 must be decreased to accommodate the output of the concentrator. This consequently reduces the volume of the core 608 that must be heated. Thus, in one embodiment the geometry of the heat transfer core 608 is designed to conform to the output of the CPC. This is illustrated in the combination of CPC array 600 and heat transfer core 602.

The micro-optical arrays can be formed using a variety of techniques including molding and replication wherein a mold is created of the inverse shape of the final optic and that mold is used to stamp or replicate copies of the optic into various materials such a polymers or cast glassy materials. In one embodiment, the array resides within the evacuated portion of the solar collector and has optical materials that are low out gassing. It is possible that the micro-optical array could reside within the heat transfer core component where it would be exposed to the heat transfer fluid. This may mitigate issues with outgassing, but will have implications from a thermal expansion point of view, and will require that the array be compatible with the heat transfer fluid.

It may be possible to incorporate standoff structures in the micro-optic mold which would minimize conductive heat transfer to the micro-optic array. Molded standoffs 612 are shown providing mechanical support and thermal isolation between heat transfer core cover sheet 610 heat transfer core 608, which are bonded, and 2D CPC optic 606. 3D CPC designs are also possible. 3D CPC optic 614 is shown coupled to an appropriately formed heat transfer core pillar 616. 3D concentrators can provide even higher levels of concentration with further reductions acceptance angle. Arrays of such optics can also be formed via the aforementioned micro-replication techniques. One 3D CPC optic array, array 618, is shown coupled to heat transfer core 620, via heat transfer core pillars 622. Other replicated optical components, variations of CPC and combinations thereof may also be incorporated into the module in a similar fashion. The features in both heat transfer cores 602 and 620 may be formed in a molding process or via machining or micromachining means.

Figure 7:
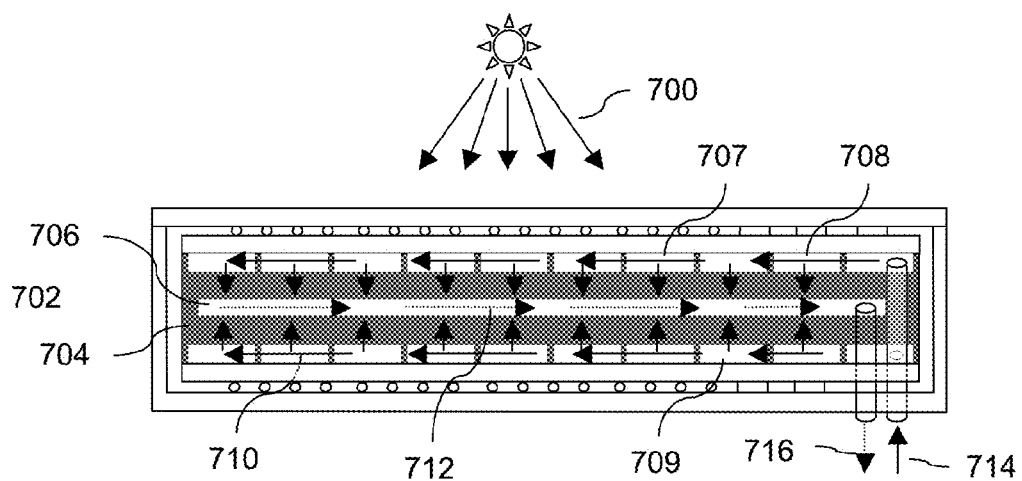
FIG. 7 of the drawings illustrates planar and tubular solar flux convertors with internal cavities, in accordance with one embodiment of the invention.
Figure 7:
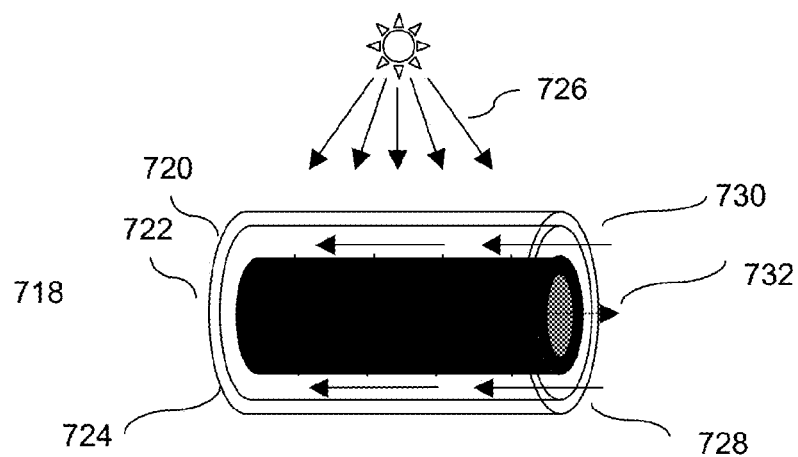

FIG. 7 illustrates the operation of a modified solar collector 702. The collector 702 differs from the one illustrated in FIG. 3 in that the heat transfer core 704, has been fabricated such that there is an internal cavity or fluid flow conduit 706 in addition to a first ingress conduit 707 and a second ingress conduit 709. During operation heat transfer fluid 714, flows into the collector 702 via the ingress conduits 707 and 709 along the paths indicated by arrows 708 and 710. Incident flux 700 is absorbed by heat transfer core 704, and subsequently converted to heat. As the heat transfer fluid passes into the heat transfer core 704 it rises in temperature until it vaporizes. The internal cavity 706 is engineered so that the resulting vapor flows within it in the direction of arrows 712, where it and the heat it contains can be extracted via outflow pipe 716. The collector 702 exhibit further reductions in heat radiative heat losses because the liquid phase on the rear side of the heat transfer core 704, shown by arrow 710, limits radiative losses from the rear side. Various other cavities or other internal pipes and conduits can be engineered into the structure of the heat transfer core 704. These can serve to alter or redirect fluid and vapor flows within the heat transfer core in such a fashion as to optimize the overall performance of the device.

FIG. 7 also illustrates an alternative geometry for a solar collector in the form of tubular converter 718. Converter 718 comprises a transparent outer shell 720, and a transparent inner shell 722. A vacuum is established between the two shells to eliminate thermal losses through convection. Anti-reflection, low emissivity, and heat mirror coatings may also be applied to the inner and outer surfaces of the shells in order to maximize light transmission and minimize thermal radiation out of the device. Heat transfer core 724, is fashioned from the same materials and using the same techniques as those used to fabricate the heat transfer cores which reside in the rectangular solar collector described above. The collector 718 also has an internal cavity. Solar radiation 726 is transmitted through the shells 720, 722 to strike heat transfer core 724 where it is absorbed and converted into heat. Heat transfer fluid 728 and 730, flows into the converter along the path indicated by the solid arrows. When transfer fluids 728, 730 come into contact with the heat transfer core 724 evaporation occurs. The resulting vapor and the heat it carries are extracted through the internal cavity along the path indicted by dotted arrow 732. Like the planar solar collectors, the heat transfer fluid also serves to minimize the amount of heat radiated from the heat transfer core thus increasing the maximum attainable temperature and the overall conversion efficiency. Also like the planar collectors the heat transfer core may comprise a fluid transfer element and a light absorption element positioned such that sunlight passes through the fluid transfer element, along with the heat transfer fluid, before striking the light absorption element.

Figure 8:
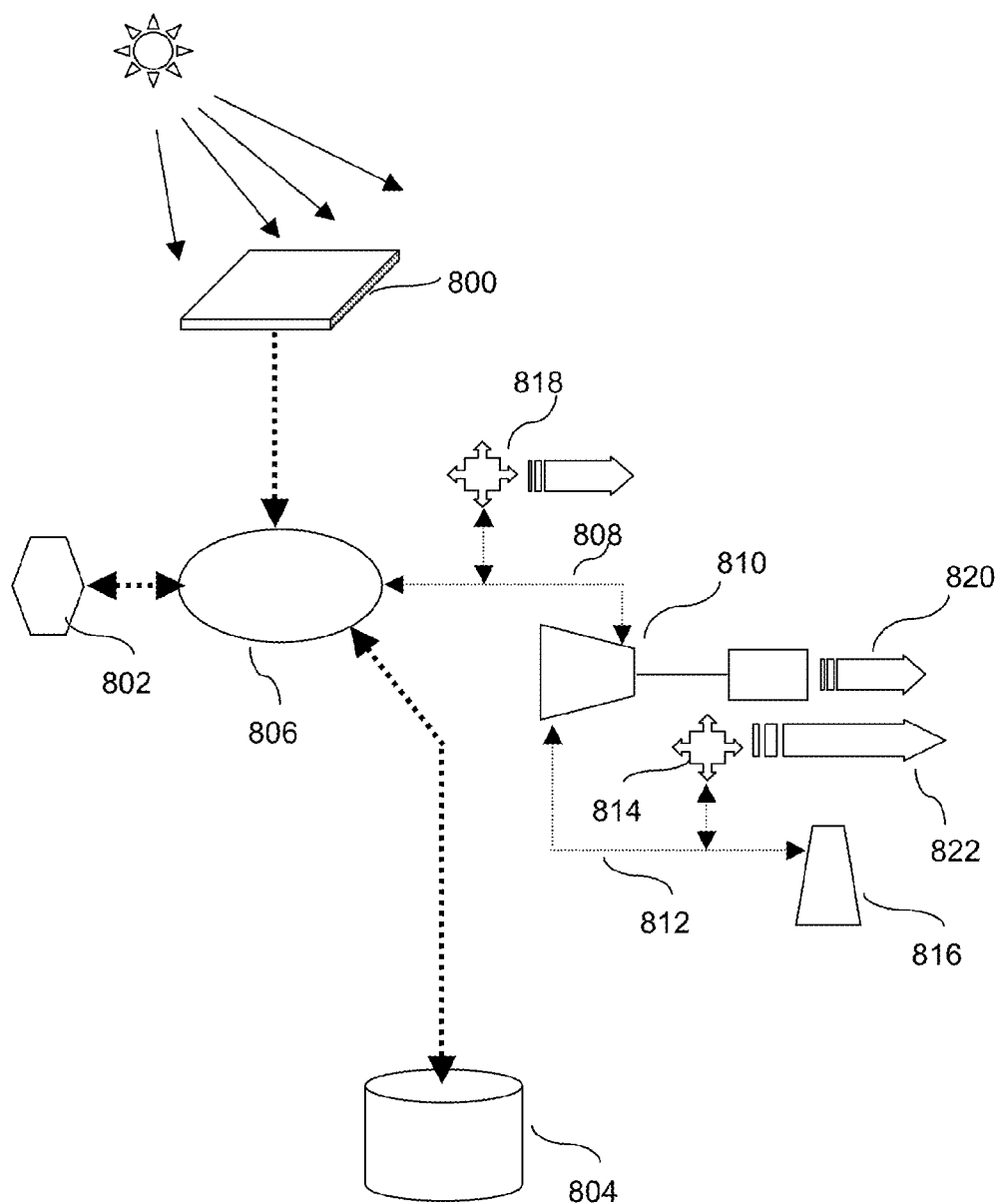
FIG. 8 of the drawings illustrates a thermal energy conversion system incorporating s solar flux converter, in accordance with one embodiment of the invention.

FIG. 8 illustrates a thermally driven energy generation system of the kind described in more detail in the aforementioned U.S. patent application Ser. No. 12/396,336. All of the components are connected via a thermal transfer network that could comprise an array of thermal connectors such as heat pipes, insulated conduits which guide the flow of a heat transfer fluid, or other mechanisms of the sort described herein. Solar collector 800, thermal source 802, and thermal storage unit 804 provide heat to thermal consolidator 806. Thermal source 802 may be one or more sources of heat including but not limited to the direct combustion of fossil fuels, waste heat from industrial processes or boilers, or via the indirect combustion of fossil fuels producing an exhaust heat source from a reciprocating engine, a turbine or other heat engine. Thermal 802 consolidator comprises one or more heat exchangers and associated heat transfer connections and heat transfer switches, and its overall function is to aggregate all the heat sources in a way that can be directed by a control system to optimize the quality, quantity and temperature of the heat which it supplies to the system. A heat transfer switch could include, for example, a valve which directs the flow of a heat transfer fluid from one conduit to another. Heat supplied by the consolidator is transferred via thermal connector 808, to a Rankine or other heat engine 810. The engine converts some portion of this heat into mechanical energy that can be subsequently used to drive a generator to produce electricity 820. The engine may comprise an organic rankine cycle wherein the working fluid of the heat engine does not comprise water.

Waste heat from this process is transferred via thermal connector 812 to heat rejector 816, which rejects the heat to the environment or some other suitable heat sink. A portion of the heat going to heat engine 810 may be extracted and used by cooling unit 818. This unit is a thermally driven cooling system which could rely on absorption, adsorption, steam ejection cooling, or any one of a number of heat driven processes which are well known by those skilled in the art of such devices. The output is in the form of a cooled thermal medium that can be used to cool buildings or other facilities which can utilize this function. Heat extractor unit 814, can use some portion of the heat to be rejected to provide a heated medium 822 that may also find use within a building or other facility for space heating, water heating or other uses. The heat for this purpose may also come directly from thermal consolidator 806 via a path not shown. The location of the cooling unit, the heat engine, and heat extractor may be interchangeable, or they may both reside at the same location depending on how they function, and the quality of heat that they require to function properly.

The aforementioned control system is an electronic module with a central processor or processors and interface circuitry, a communications interface, and a variety of sensors to detect the state of the energy generation system as well as the energy consumer and the environment, and outputs which are able to control the state of the system and in particular the real time mixture of heat sources supplied to the consumer. The state of the generation system could include a variety of characteristics such as the temperature and output of heat from the various sources listed above, the amount of sunlight irradiating any solar panels, the amount of heat within the storage module, and the amount of fuel available to the fossil fuel driven heat source. The state of the consumer could include the internal temperature of a household or the heat needs of an industrial process depending on what kind of consumer. This sensor information could be combined with additional information from the communications system which could include weather predictions, and therefore available sunlight, or stored information about the needs of the user, fuel cost projections and a maintenance schedule for all thermals sources. In general the goal of the control system is to insure that heat is available to the consumer in the most time and cost effective way possible based on the cost of energy for each heat source, its availability, and the needs of the consumer. In this way the system can adapt to a variety of circumstances during which one or more of the heat sources is unavailable for reasons such as weather, lack of sun at night, or an inefficient mix of electricity and heat from the fossil fuel driven heat engine. For the latter situation it is sometimes possible that more heat is available than required by the consumer.

Heat which, is supplied from the sun is subject to variations in quantity due to changes in weather conditions and other environmental factors. As a result, the heat required to operate the associated heat engine, from a pure solar source, may fall below the threshold required to maximize the efficiency of the heat engine. Heat from other thermal sources, such as those described above, can be generated independently of the weather and the quantity of this heat can often be modulated or varied rapidly. This is especially true when compared to the rate at which environmental conditions can change. For systems wherein the bulk of the heat is supplied by a solar thermal source it can be advantageous to incorporate a supplemental source whose output is can be modulated quickly enough to compensate for environmentally induced solar thermal heat losses. Several of the aforementioned non-solar heat sources fit within this category and can therefore be utilized to great advantage in a thermally driven energy generation system.

Figure 9:
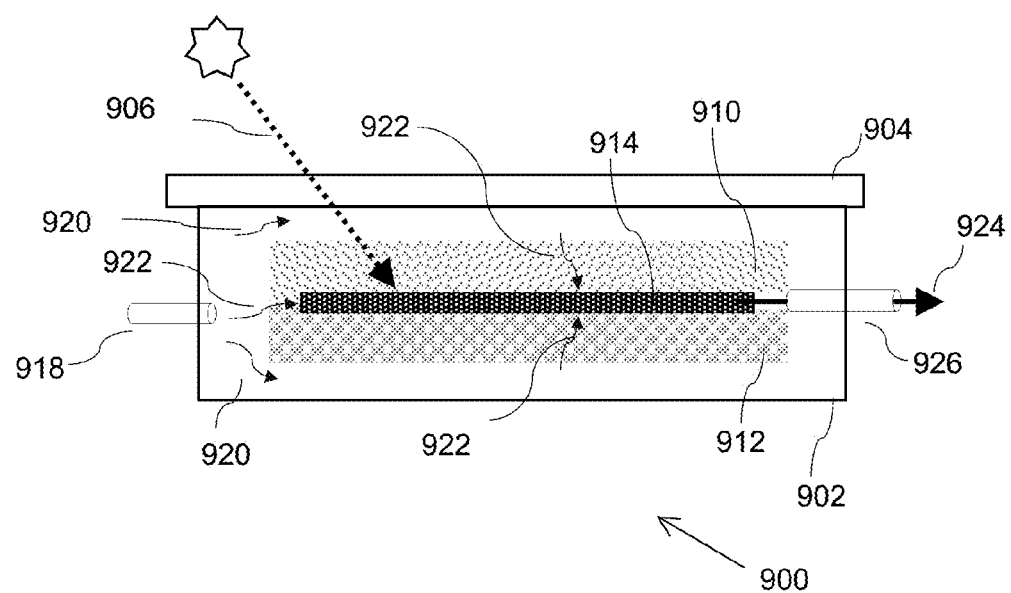
FIG. 9 of the drawings shows a cutaway diagram of a simplified solar flux conversion module, in accordance with one embodiment of the invention.

Referring now to FIG. 9, a cutaway drawing of simplified design for solar flux converter 900 is shown. Housing 902 is similar to collector housing plate 328 of FIG. 3 in both function and material composition. It is hermetically sealed to facesheet 904 which, is similar in function and material composition to the facesheet 300 of FIG. 3. Facesheet 904 may also have anti-reflection coatings on one or both of its surfaces which, are designed to optimize the amount of light transmitted in the visible and near infrared spectrums. Sunlight 906 is transmitted through facesheet 904 and propagates through fluid transfer element 910,912 and is ultimately incident on light absorption element 914. Light absorption element 914 may be in the form of a sheet of metal, glass, plastic or a fabric made from these materials, or other materials in planar form. It may also be a porous medium made of the same materials. The material must be capable of withstanding temperatures as high as several hundred degrees centigrade or more without degradation. In either case the surface on to which light 906 is incident is coated or otherwise treated so that it is highly absorbing to visible and near infrared light and has a low emissivity for frequencies longer than the near infrared. There are many such coatings, which, are commercially available including but not limited to titanium oxynitride, black chrome, submicroscopic structures, and others, which are well known those skilled in the art of making such coatings. Light absorption element 914 is suspended or otherwise supported so that in one preferred embodiment it resides completely within the volume of fluid transfer element 910,912. In another preferred embodiment fluid transfer element 910, 912 comprises two different materials wherein fluid transfer element 910 may be an aerogel material in a form and composition as described for the embodiment of FIG. 3, and fluid transfer element 912 may be a material such as fiberglass, rock wool, a vacuum insulating panel, or some other material or component with low thermal conductivity. In this embodiment it is possible that no fluid is transferred through fluid transfer element 912 and all of the fluid to be heated passes through fluid transfer element 914.

Referring again to FIG. 9, in one embodiment light absorption element 914 is suspended by mechanical mounts, not shown, which may be in the form of support rods, struts, tensioned fibers or wires, or other elements which are connected to the collector housing 902. All of these options are designed, via their construction or material composition or both, to minimize the amount of heat, which is conducted from the light absorption element to the housing.

Referring again to FIG. 9, sunlight 906 is absorbed by light absorption element 914, which is heated as a consequence. Ingress conduit 918 provides a means to admit a heat transfer fluid 920, into the interior of the housing 902 where it flows in the space between the interior surface of the housing 902 and the exterior of fluid transfer element 910,912. The heat transfer fluid 920 subsequently flows through the porous surface of fluid transfer element 910 and 912, if fluid transfer element 912 is porous. The heat transfer fluid follows generally along the path of the arrows 922, and propagates through the fluid transfer element where it subsequently comes into contact with light absorption element 914. This causes the temperature of the heat transfer fluid to rise and the resulting heated fluid 924 exits the collector housing 902 via egress conduit 926.

What is claimed is:

1. A solar collector, comprising:
a solar collector body defining a housing with at least one window to permit solar radiation to enter the solar collector body;
a heat transfer component positioned within the solar collector body and comprising:
a heat transfer component housing;
a heat transfer core positioned within the heat transfer component housing and having a light absorption element, and a fluid transfer element comprising an aerogel with voids shaped and dimensioned to support passive pumping of the heat transfer fluid therethrough;
at least one ingress conduit disposed between the heat transfer core and the heat transfer component housing;
an inlet to introduce a heat transfer fluid into the at least one ingress conduit;
at least one egress conduit in flow communication with the heat transfer core; and
an outlet to allow the heat transfer fluid in the egress conduit to exit the egress conduit; wherein heat transfer fluid is transferred from the at least one ingress component into the heat transfer core by the fluid transfer element, undergoes heating in the heat transfer core with heat generated through the absorption of light by the light absorption element, and is released into the egress conduit.

2. The collector of claim 1, comprising a single ingress conduit, and a single egress conduit; wherein the heat transfer core is disposed between the single ingress conduit and the single egress conduit.

3. The collector of claim 1, comprising two ingress conduits, and a single egress conduit; wherein the heat transfer core is positioned between the two ingress components and the single egress component is disposed within the heat pipe component.

4. The collector of claim 1, further comprising at least one low emissivitiy coating to absorb visible light on the surface of the light absorption element and to minimize the amount of infrared light radiated from the light absorption element.

5. The collector of claim 1, further comprising at least one anti-reflective layer to maximize a transmission of visible light into the heat transfer component.

6. The collector of claim 1, further comprising at least one reflective layer to prevent radiation of infrared light.

7. The collector of claim 1, wherein the fluid transfer element is adapted to wick the heat transfer fluid.

8. The collector of claim 1, further comprising a vacuum formed between the heat transfer component and the solar collector body.

9. The collector of claim 1, further comprising a light concentrating mechanism to concentrate incident light from a wide collection angle onto the heat transfer core.

10. The collector of claim 9, wherein the light concentrating mechanism comprises an array of compound parabolic concentrators coupled to the heat transfer core.

11. The collector of claim 1, wherein the aerogel is organic and is selected from the group consisting of resorcinol-formaldehyde, melamine-formaldehyde, and combinations thereof.

12. The collector of claim 1, wherein the aerogel is inorganic and is selected from the group consisting of metal oxides such as silica, titania, alumina and combinations thereof.

13. A solar collector, comprising:
a solar collector body defining a housing with at least one window to permit solar radiation to enter the solar collector body;
a heat transfer core positioned within the solar collector body and having a light absorption element, and a fluid transfer element in the form of an aerogel comprising voids shaped and dimensioned to support passive pumping of the heat transfer fluid therethrough;
at least one ingress conduit disposed between the heat transfer core and the heat transfer core;
an inlet to introduce a heat transfer fluid into the at least one ingress conduit;
at least one egress conduit in flow communication with the heat transfer core; and
an outlet to allow the heat transfer fluid in the egress conduit to exit the egress conduit; wherein heat transfer fluid is transferred from the at least one ingress component into the heat transfer core by the fluid transfer element, undergoes heating in the heat transfer core with heat generated through the absorption of light by the light absorption element, and is released into the egress conduit.

14. The collector of claim 13, comprising a single ingress conduit, and a single egress conduit; wherein the heat transfer core is disposed between the single ingress conduit and the single egress conduit.

15. The collector of claim 13, further comprising at least one low emissivitiy coating to absorb visible light on the surface of the light absorption element and to minimize the amount of infrared light radiated from the light absorption element.

16. The collector of claim 13, further comprising at least one anti-reflective layer to maximize a transmission of visible light into the heat transfer component.

17. The collector of claim 13, further comprising at least one reflective layer to prevent radiation of infrared light.

18. The collector of claim 13, further comprising a light concentrating mechanism to concentrate incident light from a wide collection angle onto the heat transfer core.

19. The collector of claim 13, wherein the light concentrating mechanism comprises an array of compound parabolic concentrators coupled to the heat transfer core.

20. The collector of claim 13, further comprising mechanical supports to support the light absorption element within the fluid transfer element.

21. The collector of claim 20, wherein the supports comprise tensioned wire.

22. The collector of claim 13, wherein the fluid transfer element comprises aerogel.

23. The collector of claim 22, wherein the aerogel is organic and is selected from the group consisting of resorcinol-formaldehyde, melamine-formaldehyde, and combinations thereof.

24. The collector of claim 22, wherein the aerogel is inorganic and is selected from the group consisting of metal oxides such as silica, titania, alumina and combinations.

25. The collector of claim 22, wherein the aerogel is in particulate form.

26. The collector of claim 22, wherein the aerogel is in monolithic form.

\* \* \* \* \*